No. 860,639. PATENTED JULY 23, 1907.
F. H. CRAGO.
TRAP ADJUSTER.
APPLICATION FILED NOV. 2, 1906.
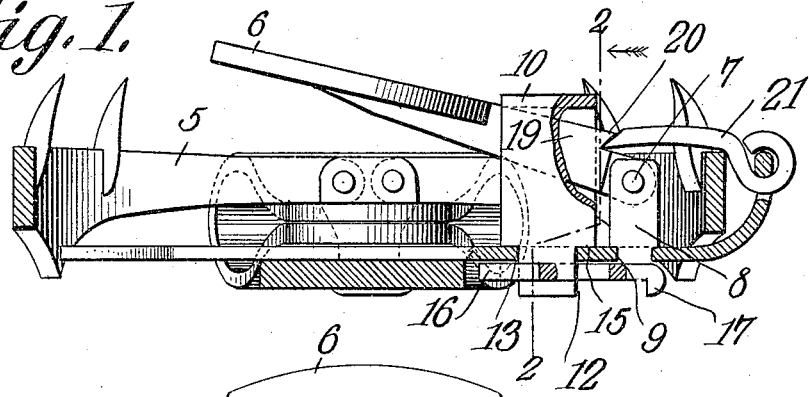
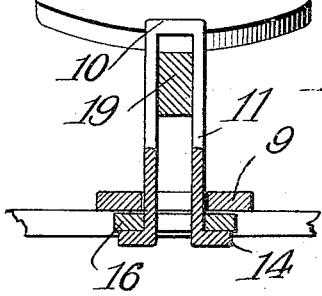
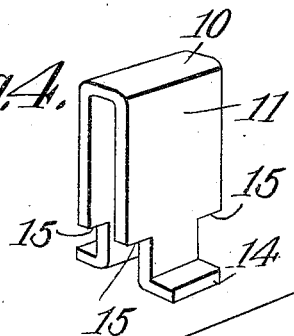
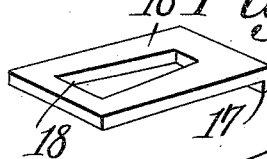
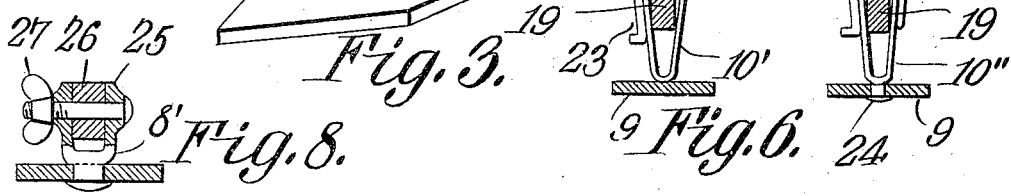
WITNESSES. Felix H. Crago, INVENTOR.
By C. A. Snow & Co.
ATTORNEYS

UNITED STATES PATENT OFFICE.

FELIX H. CRAGO, OF LIVINGSTON, MONTANA.

TRAP-ADJUSTER.

No. 860,639.  Specification of Letters Patent.  Patented July 23, 1907.

Application filed November 2, 1906. Serial No. 341,750.

*To all whom it may concern:*

Be it known that I, FELIX H. CRAGO, a citizen of the United States, residing at Livingston, in the county of Park and State of Montana, have invented a new and useful Trap-Adjuster, of which the following is a specification.

This invention relates to animal traps and more particularly to means for regulating the throw of the platform or trigger pan thereby to permit the trap to be used in trapping or catching large or small game.

A further object of the invention is to provide a clamping member adapted to engage the shank of the pan or platform for retarding the downward movement of the same, said clamping member being adjustable thereby to vary the pressure or clamping action exerted on said shank and thus regulate the throw of the impaling jaws according to the weight of the animal.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a longitudinal sectional view of an animal trap showing the improved adjusting means in position thereon. Fig. 2 is a transverse sectional view taken on the line 2—2 of Fig. 1 and looking in the direction of the arrow. Fig. 3 is a perspective view of the supporting arm detached. Fig. 4 is a similar view of the spring clip forming the clamping member. Fig. 5 is a perspective view of the key or slide for adjusting the clamp. Fig. 6 is a transverse sectional view illustrating a modified form of the invention. Fig. 7 is a similar view showing the clip illustrated in Fig. 6 attached to the supporting arm. Fig. 8 is a transverse sectional view illustrating a still further modification.

Similar numerals of reference indicate corresponding parts in all of the figures of the drawings.

The improved adjusting means may be used in connection with different styles of animal-traps and by way of illustration is shown applied to an animal trap of the ordinary pivoted jaw type in which 5 designates the pivoted jaws and 6 the platform or trigger-pan pivotally mounted at 7 on a post 8 extending vertically from the supporting arm 9.

The attachment consists of a clamping member preferably in the form of an inverted U shaped clip 10 the parallel arms 11 of which are reduced at 12 and engage the walls of a suitable opening 13 formed in the supporting arm 9, the terminals of the reduced extensions 12 being bent laterally to form outwardly extending flanges 14 which serve to prevent accidental displacement of said clip.

The spring arms 11 of the clip are formed with oppositely disposed alined shoulders 15 which bear against the upper surface of the supporting arm 9 and serve to limit the downward movement of the clamping member. The flanges 14 are spaced from the lower surface of the supporting arm 9, and interposed between the flanges 14 and the arm 9 is a slide or locking key 16 provided with a terminal finger-piece 17 and having a wedge shaped recess 18 formed therein and adapted to bear against the walls of the adjacent extensions 12 thereby to force the arms 11 into frictional engagement with the shank 19 of the pan or platform and thus retard the downward movement of the same so as to permit the trap to be used for catching large or small animals, birds or other game. The shank 19 of the pan or platform is formed with the usual locking notch 20 for engagement with the sear 21 whereby the trap is locked in set position. Attention is here called to the fact that the closed end of the yoke or clip 10 embraces the top of the shank 19 thus serving to limit the upward movement of the same.

It will thus be seen that by adjusting the slide or locking key 16 longitudinally of the supporting arm 9 the pressure or clamping action exerted by the arms 11 on the adjacent walls of the shank 19 may be regulated at will thus regulating the movement of the pan or platform according to the weight of the animal.

It will here be noted that the shoulders 15 limit the downward movement of the clip 10 while the flanges 14 limit the upward movement thereof and at the same time serve to lock the slide or key 16 in engagement with the lower surface of the supporting arm.

In Fig. 6 of the drawings there is illustrated a modified form of the invention in which the clip 10′ is inverted and loosely mounted on the shank 19 of the bait-platform. In this form of the device a transverse pin or rod 22 connects the free ends of the arms comprising the clip 10′ and is provided with a terminal crank or handle 23 adapted to engage the walls of the adjacent spring clamping arms, the width of the arms being equal to or greater than the length of the crank 23 so that by rotating said crank the arms may be moved into or out of engagement with the walls of the shank 19 and thus assist in retarding the movement of the bait-platform.

In Fig. 7 the clip 10″ is rigidly secured to the supporting arm 9 by a pin or stud 24, the construction being otherwise substantially the same as that shown in Fig. 6.

A further modification is illustrated in Fig. 8 of the drawings in which the spaced arms 25 of the platform-supporting post 8′ are formed of spring-metal and pierced by a transverse bolt 26 which also pierces the adjacent end of the shank 19 so that by adjusting the nut 27 the spring arms 25 may be forced into frictional engagement with the adjacent walls of the shank so as to regulate the throw of the pan or platform.

From the foregoing description it is thought that the construction and operation of the device will be readily understood by those skilled in the art and further description thereof is deemed unnecessary.

Having thus described the invention what is claimed is:

1. In a trap, a trigger, and a clamping member engaging the trigger for retarding the movement of the same.

2. In a trap, a pivoted trigger, a clamping member engaging the trigger, and means for adjusting the clamping member thereby to retard the movement of the trigger.

3. In a trap, a pivoted trigger, a clamping member provided with spaced arms adapted to embrace the trigger, and means for moving the arms into and out of engagement with the trigger thereby to retard the movement of the latter.

4. In a trap, a trigger, a U shaped clamping member embracing the trigger, and means for adjusting the clamping member thereby to retard the movement of the trigger.

5. In a trap, a trigger, a clamping member embracing the trigger, and a slide engaging the clamping member for moving the clamping member into and out of engagement with the trigger thereby to retard the movement of the same.

6. In a trap, a trigger, a clamping member embracing the trigger, and a slide having a wedge shaped opening formed therein and adapted to engage the clamping member for actuating the same to regulate the movement of the trigger.

7. In a trap, a supporting arm, a trigger pivotally mounted on said arm, a clamping member embracing the trigger and extending through an opening in the supporting arm, and means engaging the free end of the clamping member for adjusting the latter thereby to retard the movement of the trigger.

8. In a trap, a supporting arm, a trigger pivotally mounted for swinging movement on said arm, a clamping member embracing the trigger and provided with reduced extensions passing through an opening in the supporting arm and having their terminals bent outwardly to form laterally extending flanges, and a slide interposed between the flanges and the supporting arm for adjusting the clamping member thereby to retard the movement of the trigger.

9. In a trap, a supporting arm having an opening formed therein, a trigger pivotally mounted for swinging movement on said arm, a substantially U shaped clip embracing the trigger and having its parallel legs extended through the opening in the supporting arm and the terminals thereof bent outwardly to form laterally extending flanges, the legs of said clip being provided with shoulders adapted to bear against the upper surface of the support, and a slide interposed between the flanges and the lower surface of the supporting arm and having a wedge shaped opening formed therein the walls of which are adapted to bear against the legs of the clip thereby to retard the movement of the trigger.

In testimony that I claim the foregoing as my own, I have hereto affixed my signature in the presence of two witnesses.

FELIX H. CRAGO.

Witnesses:
JOHN T. SMITH,
VARD SMITH.